United States Patent [19]

Miller et al.

[11] 4,264,075
[45] Apr. 28, 1981

[54] TWO PIECE MOLDED GOLF BALL

[75] Inventors: Richard Miller, Belle Mead; Murray H. Reich, Princeton, both of N.J.

[73] Assignee: Princeton Chemical Research, Inc., Princeton, N.J.

[21] Appl. No.: 927,706

[22] Filed: Jul. 24, 1978

Related U.S. Application Data

[62] Division of Ser. No. 602,960, Aug. 7, 1975, abandoned.

[51] Int. Cl.³ .................... A63B 37/06; A63B 37/12
[52] U.S. Cl. .................... 273/235 R; 260/42.32; 260/42.47; 260/998.14; 525/274; 525/301
[58] Field of Search ............ 260/998.14, 879, 42.32, 260/42.47; 273/235 R; 525/274, 301

[56] References Cited

U.S. PATENT DOCUMENTS

| | | | |
|---|---|---|---|
| 3,177,280 | 4/1965 | Ford et al. | 273/235 R |
| 3,454,280 | 7/1969 | Harrison et al. | 273/235 R |
| 3,553,159 | 1/1971 | Miller et al. | 260/998.14 |
| 3,784,209 | 1/1974 | Berman et al. | 273/235 R |
| 3,791,655 | 2/1974 | Schweiker et al. | 260/998.14 |
| 3,819,768 | 6/1974 | Molitor | 273/235 R |
| 3,940,146 | 2/1976 | Little | 260/998.14 |
| 4,056,269 | 11/1977 | Pollit et al. | 260/998.14 |
| 4,082,288 | 4/1978 | Martin et al. | 260/998.14 |

FOREIGN PATENT DOCUMENTS 1364138  8/1974  United Kingdom ............... 273/235 R Primary Examiner—Allan Lieberman
Attorney, Agent, or Firm—Darby & Darby

[57] ABSTRACT

A golf ball is formed by molding a center of a homogeneous mass of polybutadiene with a metal salt of an unsaturated acid such as zinc dimethacrylate and a filler such as zinc oxide, and a cover of an ionic copolymer is formed about the center by coating as by electrodeposition or by molding. Molding of the center can successfully be carried out quickly above 170° C. and the balls can be driven long distances. The centers can be molded with projections which are used for proper centering when molding a cover thereabout.

10 Claims, No Drawings

TWO PIECE MOLDED GOLF BALL

This is a division of application Ser. No. 602,960, filed Aug. 7, 1975, now abandoned.

BACKGROUND OF THE INVENTION

The present invention relates to two-piece molded products consisting of a cover comprising an ionic copolymer and a center part containing cis-polybutadiene or other elastomers, and a monomer capable of cross-linking the elastomer into a three-dimensional network. More specifically, the cross-links in the center part are relatively long and flexible. Such molding compositions are eminently suitable for the production of molded golf balls, particularly unitary molded golf balls. Molding compositions of this general class, and unitary molded golf balls which can be produced from them, are described in U.S. Pat. No. 3,313,545 issued Apr. 11, 1967 and U.S. Pat. No. 3,438,933 issued Apr. 15, 1969.

There are several advantages of homogeneous, unitary construction for a golf ball, in contrast to the wound golf balls of the earlier art. Unitary golf balls can be produced with a perfect center of gravity and thus have excellent aero-dynamic properties, superior roll and trueness of flight. Such golf balls are highly resistant to cutting, and are often indestructible in normal play. These balls will return to round even when severely distorted, and thus maintain their superior flight characteristics after extended use. Homogeneous, unitary golf balls may be manufactured with better quality than conventional wound balls.

As contrasted with the conventionally covered wound balls, unitary balls maintain their playing characteristics in hot and cold weather, have an excellent shelf-life and will not water-log. If the paint on the golf ball becomes worn or damaged, the balls may be very readily reclaimed by removing or stripping off the old paint and repainting. By contrast, conventional wound balls seldom last long enough to allow repainting.

Such unitary balls may be molded in mating precision hemisphere molds or dies into which a cylindrical or other shaped slug of moldable material is placed, as described in U.S. Pat. Nos. 3,313,545 and 3,438,933, the disclosures of which are incorporated herein by reference. The slugs may be cut from the extrudate of a mixer-extruder. After placing of the slug, of sufficient size to fill the mold, the mold halves are closed, and heat and pressure are provided for enough time to cure the moldable elastomer. The moldable material comprises an elastomer, a cross-linking monomer, a filler and a cross-linking catalyst. The balls after discharge from the mold are buffed, surface treated and then painted and stamped in conventional manner.

Improved unitary molded golf balls are described in U.S. Pat. No. 4,056,269, issued Nov. 1, 1977. The improved unitary golf balls utilize a specific sub-group of cross-linking monomers and can yield molded golf balls with better rebound than prior unitary golf balls, superior playing qualities equal to or surpassing the highest quality wound golf balls available and maintaining the advantages of unitary golf balls. The improved unitary balls were made with decreased amounts of filler, preferably less than about 30 phr (parts per 100 parts by weight of resin) of filler and more preferably less than about 15 phr of filler. These low filler additions are postulated to give higher rebound and superior distance to the improved golf balls. However, golf balls made commercially by the normal procedures described in U.S. Pat. No. 4,056,269 have several deficiencies. To produce a golf ball having a suitable compression and one which is commercially acceptable to the normal golfer, it is necessary to use substantial amounts of monomer, preferably over 30 parts. These golf balls with higher monomer content do not possess flight distance equivalent to the best wound balls and, in fact, are several yards shorter than these high quality golf balls although still superior to the unitary golf balls described in the original patents.

Another shortcoming of the improved golf ball is a tendency of the golf ball to chip in prolonged use although the golf balls remain highly resistant to cutting. This tendency towards chipping is attributed to the highly exothermic reaction occurring in the center of the golf ball and resultant high temperatures noted in the center, over 220° C., as contrasted with the lower temperature of the press at the skin of the golf ball. The wide gradient in temperature across the width of the golf ball is postulated to encourage poor chip-resistance in these improved golf balls.

Another deficiency in the improved golf ball is the lower temperature and consequently longer cure cycle needed to obtain good durability. The original solid molded golf balls are readily cured in short cycles of about 10-20 minutes at high temperatures of 170° to 180° C. When these same cycles are applied to the improved golf ball using the metal-containing monomer, marked reductions in durability are noted, as evidenced by a decrease in cannon life as the cure temperature is raised to 170° to 180° C. Accordingly, the improved golf balls are made at 150° to 160° C. and cure cycles of 30 to 35 minutes.

Another deficiency of the improved golf ball is the existence of unduly heavy tough flash at the equator of the balls which causes increased work to obtain clean looking surfaces and also a number of rejects due to the thickness and unevenness of the flash.

While such improved golf balls are quite satisfactory and do constitute an improvement over the standard unitary golf balls with respect to distance, rebound and click, it is an object of this invention to improve further the properties of such molded golf balls with respect to flight distance, flight pattern, rebound, durability, and ease of manufacturing as reflected by shorter cure cycles, elimination of rejects due to faulty buffing and stamping.

SUMMARY OF PRESENT INVENTION

It has been discovered that uniform and improved golf balls having superior flight pattern and distance, excellent roundness, uniformity of high compression, durability, resistance to chipping, ease of manufacturing and of high quality can be obtained by molding a solid center using the technology described in U.S. Pat. No. 4,056,269 and then surrounding it with a cover comprising a hard, impervious, tough, cut- and chip-resistant polymer that can be molded readily onto the solid center. It has been further discovered that the kind of treatment of the center surface affects the unity of the ball, the certain surface treatments, e.g., chromic acid under specific concentrations and for specific periods, alter the surface. When suitably treated, the cover adheres readily to the surface of the solid center to provide an essentially unitary golf ball.

It has been further discovered that the uniformity of the solid center as evidenced by compression of the center across several diameters on the sphere, is improved by employing specially produced and shaped slugs in the mold at the onset of cure as described in U.S. Pat. No. 4,065,537, issued Dec. 12, 1977 the disclosure of which is incorporated herein by reference. The uniformity and roundness of the center affect the flight pattern and the uniformity of the completed golf ball. Thus, the center is desirably isometric, i.e. has a difference of less than 10 units between the minimum and maximum compressions measured across diameters at all points on the center.

In accordance with another aspect of the invention it has been found that the composition of the center has a marked bearing on the performance of the covered ball.

It has been further discovered that the core temperature and the type of filler have a significant effect on the performance of the covered ball, viz. permit driving a distance in excess of 230 yards under standard test conditions. This is about 5 yards better than a similar one-piece ball molded from a corresponding composition and of the same compression, obtained by raising the content of zinc methacrylate and adjusting the content of zinc oxide to produce the proper density, e.g zinc methacrylate corresponding to 23 phr of methacrylic acid and 25 phr of zinc oxide of which a portion forms the methacrylate.

DESCRIPTION OF THE INVENTION

Center

The elastomer preferred in the present invention is cis-polybutadiene rubber of at least about 40% cis configuration.

The monomer generally comprises a normally solid metal compound of a polymerizable organic moiety, and a preferred group of such monomers is the metal salts of unsaturated, polymerizable organic acids. Preferably the monomer is soluble in the elastomer base, or readily dispersible in the elastomer under the usual conditions of rubber compounding or the monomer is capable of being formed in situ from at least one precursor which is readily soluble in the elastomer base.

An example of in situ formation is by predispersion of a suitable base metal compound in the cis-polybutadiene rubber, such as zinc oxide or carbonate, followed by the addition of a suitable polymerizable acid, such as acrylic or methacrylic acid. The resulting monomer, zinc diacrylate or zinc dimethacrylate, is thus formed during compounding, and is therefore present in a desirably high degree of dispersion or solution in the elastomer matrix.

Examples of suitable metals include but are not restricted to zinc, magnesium, calcium, lithium, sodium, potassium, cadmium, lead, barium, zirconium, beryllium, copper, aluminum, tin, iron, antimony and bismuth. Polyvalent metals, i.e. those having a valence higher than 1, and especially the divalent metals zinc, magnesium, and calcium are a preferred sub-group.

Examples of metal salts of polymerizable organic acids include but are not restricted to salts of the following general formulas:

(a) carboxylates, sulfonates, and sulfinates of the formulas $(RCO_2)_m \cdot M$, $R(SO_3)_m \cdot M$, $R(SO_2)_m \cdot M$, $(RCO_2)_p \cdot MO$, $(RSO_3)_p \cdot MO$, $R(SO_2)_p \cdot MO$;

(b) phosphonates of the formulas $(R_2PO_2)_m \cdot M$, $(R_2PO_2)_p \cdot MO$, $(RPO_3)_q \cdot M$, $(RPO_3) \cdot M'O$;

(c) imide salts of the formulas

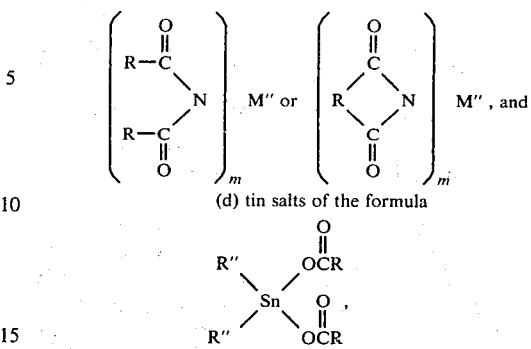

(d) tin salts of the formula $$R'' \diagdown \underset{R''}{\overset{}{\diagup}} Sn \underset{\underset{OCR}{\overset{O}{\|}}}{\overset{\overset{O}{\|}}{\diagup}} \overset{OCR}{\diagdown}$$

wherein each R independently is a group having at least one polymerizable olefinic unsaturation, R' is a divalent group having a polymerizable olefinic unsaturation, each R" independently is an alkyl, aryl or aralkyl group, M is a metal ion having a valence, m, of from 1 to 5, M' is a metal ion having a valence of 4, M" is a metal ion having a valence of 1 or 2, p is m-2 when m is greater than 2, and q has the value m/2 when m is 2 or 4.

In (a), (b), (c), and (d), the R's may be alkenyl, aralkenyl, alkenylaryl, heterocyclic, or cycloalkenyl, and contain halogen, nitro, cyano, keto, ester, ether and or amido substituents, provided that the metal containing cross-linking monomer contains at least one polymerizable olefinic unsaturation per molecule. The alkenyl radicals, when present, preferably are lower alkenyl and the aryl radicals, when present, are preferably phenyl, each of which may be substituted as indicated.

Mixtures of different metal-containing polymerizable monomers may also be used within the scope of the present invention, provided that at least one member of the mixture be homopolymerizable. Other members of the mixture may be copolymerizable or homopolymerizable, or else only copolymerizable. An example of the second type of monomer is zinc dimaleate, which is copolymerizable with zinc dimethacrylate but not homopolymerizable.

Mixtures of different metal-containing monomers may be used to advantage for the purpose of adjusting the polymerization rate or the final density of the ball; the density of the ball is desirably below about 1.13 and preferably between about 1.11 and 1.12, corresponding to a weight of about 1.5 to 1.62 ounces for a standard golf ball of about 1.68 to 1.685 inches in diameter. For example, zinc diacrylate when used as the sole metal-containing monomer polymerizes vary rapidly during curing, making the curing operation excessively exothermic and difficult to control. Thus, it may be advantageous to use mixtures of zinc diacrylate and zinc dimethacrylate in order to achieve a better balance of ease of processing, and final characteristics of the ball.

Examples of polymerizable salt-forming acids which are useful in the present invention are acrylic, methacrylic, 2-acetaminoacrylic, β,β-dimethacrylic, ethacrylic, α-chloroacrylic, 2-ethyl-3-propylacrylic, aconitinic, β-benzoylacrylic, crotonic, aminocrotonic, allylacetic, 2-allyloxypropionic, 2-furfurylacrylic, vinylacetic, allyloxyacetic, 2-vinylpropionic, vinylhydrogen phthalic, β-acryloxypropionic, 2-butene-1,4-dicarboxylic, sorbic, acetylene dicarboxylic, N-butylmaleamic, maleic, chloromaleic, di-n-butylmaleamic, N,N-dimethylmaleamic, N-ethylmaleamic, N-phenylmaleamic, dichloromaleic, dihydroymaleic, allylarsonic, chlorandic, fumaric, itaconic, styrenesulfonic, divinylbenzenesulfonic, styrenephosphonic, and styrenesulfinic acids; maleimide, and methylmaleimide. Methacrylic, acrylic, cinnamic, acotinic, crotonic, vinylacetic, itaconic, styrenesulfonic, and benzoylacrylic acids are a preferred sub-group.

The term "metal-containing polymerizable monomers" as employed herein includes such monomers which have been at least partially prepolymerized before compounding, or after compounding or processing, and before curing. Also included are salts of carboxylic polymers such as butadiene-acrylonitrile-acrylic acid, acrylonitrile-butadiene-sorbic acid, styrene-butadiene-sorbic acid, butadiene-vinylacrylic acid, butadiene-sorbic acid, and the like, provided that these polymers contain residual polymerizable unsaturations. An advantage of using such prepolymerized cross-linking salts is that the amount of heat generated when the ball is cured is minimized, in contrast to using unpolymerized monomers. The reduced exotherm makes the molding operation more easily controlled.

The amount of the metal-containing cross-linking monomer should correspond to at least about 0.046 equivalent of polymerizable unsaturation per mole of butadiene in the elastomer base, but may be as high as about 0.38 equivalent per mole. A preferred level of cross-linking monomer is in the range of about 0.06 to 0.25 equivalent per mole, while a more preferable range is about 0.08 to 0.17 equivalent per mole. Thus, if the cross-linking monomer selected is zinc dimethacrylate, more preferable amounts are in the range of about 15 to 35 parts of zinc dimethacrylate phr.

Without departing from the scope of the present invention, mixtures of metal-containing and metal-free polymerizable monomers such as esters of unsaturated acids, may also be used. Examples of metal-free polymerizable monomers include but are not restricted to vinyl, allyl, methallyl, furfuryl, crotyl and cinnamyl esters of monobasic and polybasic acids such as acetic, propionic, butyric, benzoic, phenylacetic, chloroacetic, trichloroacetic, oxalic, malonic, succinic, glutaric, adipic, pimelic, suberic, azelaic, sebacic, maleic, itaconic, citraconic, mesaconic, fumaric, citric, acotinic, phthalic, isophthalic, terephthalic, naphthalenedicarboxylic, mellitic, pyromellitic, tumesic, acrylic, methacrylic, ethacrylic, cinnamic, crotonic, cyanuric, polyolesters and anhydrides of acrylic, methacrylic, ethacrylic, crotonic, and cinnamic acids, the said polyols including ethylene glycol, di-, tri-, and tetraethylene glycol, glycerol, 1,3-butylene glycol, 1,4-butylene glycol, trimethylolpropane, pentaerythritol, propylene glycol, di-, tri-, and tetrapropylene glycols, polyethylene glycol, and polypropylene glycol; vinyl and divinyl benzene; allyl and di-allylbenzene; mono-, di-, and triallylmelamine; allyl and diallylamine; allyl ether, allyl glycolates; mono-, di-, tri-, and tetraallyl and vinyl silanes; methyl, ethyl, propyl, butyl, pentyl, hexyl, benzyl, phenyl, cyclohexyl, chloroethyl, β-cyanoethyl, dimethylaminoethyl, glycidyl, lauryl, 2-methoxy-ethyl, tetrahydrofurfuryl, hydroxyethyl and hydroxypropyl esters of acrylic, methacrylic, ethacrylic, cinnamic, crotonic, cyanuric, fumaric, maleic, and methylmaleic acids; triallyl phosphate and phosphite. Further examples include low molecular weight reactive polymers such as polymers of butadiene, isoprene, chloroprene, and epoxidized derivatives of butadiene, isoprene, chloroprene, and epoxidized derivatives of these materials.

A preferred group of metal-free polymerizable monomers are diacrylates, dimethacrylates of ethylene glycol, propylene glycol, butylene glycol, di-, and triacrylates and methacrylates of trimethylolpropane, and di-, tri-, and tetraacrylates and methacrylates of pentaerythritol. In general, metal-free monomers containing more than one polymerizable unsaturation per molecule are preferred, but monoacrylates and monomethacrylates of polyols such as ethylene glycol are also highly suitable.

To vary the density of the center so that the finished ball will have the desired weight and will not exceed the maximum allowable weight, filler is required. However, because the metal-containing monomer will contribute a higher density to the stock than other types of monomers such as esters of unsaturated acids, the amount of filler required to adjust the density will usually and advantageously be relatively low. The metal-containing monomer may be considered to function as a reactive filler as well as a polymerizable cross-linking agent. In some cases, adjustment of the amount of metal-containing monomer is all that is necessary to obtain the correct center density, so that no additional filler is required.

If an inert filler is desired, any known or conventional filler may be used which should be in finely divided form, as, for example, in a form less than about 20 mesh, and preferably less than about 60 mesh U.S. Standard screen size. Suitable fillers are silica and silicates, zinc oxide, carbon black, cork, titania, cotton flock, cellulose flock, leather fiber, plastic flour, leather flour, fibrous fillers such as asbestos, glass and synthetic fibers, metal oxide and carbonates and talc. Particularly useful is the oxide or carbonate of the same metal which is present in the metal-containing monomer. Impact modifiers such as ultra-high molecular weight polyethylene and acrylonitrile-butadiene-styrene can also be used. Reinforcing silicas can be used alone or in combination with silanes to improve the rebound properties of the center and of the covered golf ball. Of the fillers listed, zinc oxide is preferred with respect to augmenting the flight distance of the golf ball.

The amount of inert filler is dictated mainly by its type and is preferably less than about 40 parts phr and more preferably less than about 30 parts.

Advantageously, there is used a polymerization initiator which decomposes to produce free radicals during the cure cycle. The polymerization initiator need only be present in the catalytic amount required for this function and may be in general used in the amounts that the particular agent is generally used as a polymerization catalyst. Suitable initiators include peroxides, persulfates, azo compounds, hydrazines, amino oxides, ionizing radiation, and the like. Peroxides such as dicumyl peroxide, 1,1-di-t-butylperoxy-3,3,5-trimethylcyclohexane, di-b-butyl peroxide, and 2,5-bis(t-butylperoxy)-2,5-dimethylhexane are commercially available and conveniently used, usually in amounts of about 0.2–10% by weight of the elastomer.

An antioxidant may be added to the compound to minimize oxidation during processing and to prevent deterioration of the golf ball during storage. The antioxidant also prevents incipient polymerization and premature reaction during molding and prevents excessive temperature build up during molding of the center.

However, large amounts of antioxidant retard cure and can result in low compression centers. Most useful quantities of commercial polymer antioxidants are about 0.03 to 4 phr, preferred quantities are about 0.1 to 2 parts and most preferred are about 0.15 to 1.5 phr. Representative antioxidants are alkylidene bis, tris and polyphenols, and alkylated phenols and bisphenols. Other suitable anti-oxidants are disclosed in U.S. Pat. No. 3,886,683 issued June 3, 1975, the disclosure of which is incorporated herein by reference.

In accordance with a special aspect of the invention, it has been found that whereas $SiO_2$ has heretofore been described as the filler of choice, with the compositions and constructions herein zinc oxide gives markedly superior results and thus can serve to neutralize and cross link acid molecules with the excess eliminating the need for different kinds of fillers. With balls of the present type the amount of unsaturated acid is also of marked importance, suitable proportions being far narrower than for one-piece balls. Thus, the unsaturated acid should be present only in about 10 to 24 and preferably about 15 to 22 phr, lesser amounts resulting in lower compression golf balls while larger amounts result in shoter flights.

For the production of golf balls, the ingredients may initially be mixed intimately using, for example, rubber mixing rolls or a Banbury mixer, until the composition is uniform. In order to promote good dispersion, the metal-containing monomer may advantageously be formed in situ for example from the metal oxide and the corresponding acid. One preferred method of preparation is the addition of the monomer over a period of about 1 to 20 minutes to from about ¼ to ¾ of the rubber-metal oxide mixture using from about 10% less than the equivalent amount to about a 100% excess equivalent amount of metal oxide based on the amount needed to react with all the carboxyl groups, preferably about 80% excess and more preferably about 50% excess of metal oxide, mixing thoroughly and adding the remainder of the rubber-metal oxide mixture. The peroxide is added later. The mixing is desirably conducted in such a manner that the compound does not reach incipient polymerization temperatures.

Another preferred method is the addition of the unsaturated acid over a short period of time, e.g. about 0.2 to 6 minutes, to a mixture of the elastomer and metal oxide, mixing the ingredients, adding cross-linking catalyst, mixing further and dumping the batch.

The compound is formed to an appropriate shape so that the molded center is isometric in accordance with the description given in U.S. Pat. No. 4,065,537. However, the diameter of the center mold cup is smaller than that of the unitary golf ball and consequently the maximum desired width of the slug will be about 1.5 inches.

The molding is effected in mating, precision hemisphere molds or dies. The molding is a simple, straightforward operation effected in the conventional manner used in precision molding. The material, after being thoroughly mixed, is formed into suitably shaped slugs, as described in the copending application, which will facilitate insertion in the mold, and proportioned so that the mold is fully filled. The halves of the mold are then closed so that the mold cavity is entirely filled. The mold halves may be held together with pressures between about 100 and 15,000 psi and preferably between about 5,000 to 10,000 psi.

Molding temperature may vary depending on the particular composition used and may, for example, range between about 140° C. and 200° C., advantageously about 150° to 190° C. and preferably about 170° to 185° C. Curing times may range from about 50 to 1 minutes, advantageously from about 30 to 5 minutes and preferably about 20 to 10 minutes.

It is preferred to optimize the curing time and temperature in order to obtain the desired properties in the center. The best curing conditions are dependent upon the particular formulation selected. Because of the highly exothermic nature of the curing process, the properties of the center are sensitive to curing conditions but not as sensitive to the curing conditions as are the properties of the complete golf ball. The properties of the centers are less sensitive to curing conditions and the maximum temperatures obtained lower since the centers are smaller and the heat transfer is better, less monomer is used in the formulation, more filler per 100 parts of rubber is used, and the total amount of compound is less than that used in making golf balls. All these factors facilitate preparation of centers as compared to golf balls using metal-containing monomers.

After molding, the centers are removed from the molds and the surface treated to facilitate adhesion of the center to the cover of the golf ball.

The surfaces of the centers can be treated by corona discharges, ozone, chlorine, acid, and/or sand blasting. One treatment found useful comprises dipping the centers for about 1 to 20 minutes in a solution containing about 0.1 to 0.5 gram/cc of chromic acid. Preferred soaking times are about 2.5 to 15 minutes and more preferred times are about 4 to 12 minutes. The centers are washed, chlorinated using about 10–15% sodium hypochlorite solution, and dried.

The centers are ready for conversion into golf balls by providing a cover on the center ranging in thickness from about 0.002 to 0.35 and preferably from about 0.003 to 0.2 inch. The cover can be made from ethyleneacrylic acid or methacrylic acid copolymers wherein the carboxyl groups are neutralized with mono or divalent metals such as sodium, potassium, lithium, calcium, zinc or magnesium.

The ionic copolymer used to make the cover is made according to procedures given in U.S. Pat. No. 3,421,766 and British Pat. No. 963,380, neutralized according to Canadian Pat. Nos. 674,595 and 713,631 wherein the ionomer is made by copolymerizing the $\alpha$-olefin and carboxylic acid to provide a copolymer having the acid units randomly distributed along the chain. The ionic copolymer comprises one or more $\alpha$-olefins and 0.2 to 25 mole percent of an $\alpha,\beta$-ethylenically unsaturated mono- or dicarboxylic acid, the ionic copolymer containing a metal ion having an ionized valence of 1 to 3 when the acid is monocarboxylic and 1 when the acid is dicarboxylic.

At least about 20 percent of the carboxylic acid groups of the copolymer are neutralized by the metal ions, such as sodium, potassium, zinc, calcium, and the like, and exist in the ionic state. Metal ions include those of Groups I (a and b) and II (a and b), and transition elements of the Periodic Table. The olefins in this invention include ethylene, propylene, butene-1 and hexene-1 and examples of carboxylic acids which are useful in the present invention are acrylic, methacrylic, 2-acetaminoacrylic, $\beta,\beta$-dimethacrylic, ethacrylic, $\alpha$-chloroacrylic, 2-ethyl-3-propylacrylic, acotinic, $\beta$-benzoylacrylic, crotonic, aminocrotonic, allylacetic, 2-allyloxypropionic, 2-furfurylacrylic, vinylacetic, allyloxyacetic, 2-vinylpropionic, vinylhydrogen phthalic, β-acryloxypropionic, 2-butene-1,4-dicarboxylic, sorbic, acetylene dicarboxylic, N-butylmaleamic, maleic, chloromaleic, di-n-butylmaleamic, N,N-dimethylmaleamic, N-ethylmaleamic, N-phenylmaleamic, dichloromaleic, dihydroxymaleic, allylarsonic, chlorendic, fumaric, itaconic, styrenesulfonic, divinylbenzenesulfonic, styrenephosphonic, and styrenesulfinic acids; maleimide, and methylmaleimide. Methacrylic, acrylic, cinnamic, acotinic, crotonic, vinylacetic, itaconic, styrenesulfonic, and benzoylacrylic acids are a preferred subgroup.

Preferred combinations are ionic copolymers of ethylene with acrylic and methacrylic acids.

Neutralization of about 20 to 90% of the acid groups by weight is preferred and more preferred is about 30 to 75%. Preferred metal ions are sodium, lithium, potassium, magnesium, zinc and calcium and more preferred are sodium and zinc. In the solid condition the ionic copolymer is like a cross-linked product whereas in the molten state the ionic copolymer is like a non-cross linked polymer. The exact nature of the interaction between the metallic ions and the copolymer is not completely understood, but it is postulated that an ionic attraction exists between the metal ion and one or more of the carboxylic acid groups that has been ionized. The neutralization is accomplished by mixing the ionic copolymer with a basic metal-containing compound to obtain the desired degree of neutralization.

The covered ball can be formed in several ways. The center, preferably after pre-treatment as described hereinabove, which center may be smooth or non-smooth with regular or irregular protuberances of various sizes, may be placed in the center of a golf ball mold and the ionic copolymer injected into and held for some time in the space at about 120° to 200° C.

In accordance with this aspect of the invention, to ensure perfect concentricity, the center may be molded with several projections which will serve to keep it centered during the subsequent injection molding of the cover. The projections may be of any cross-section and may vary in number from two upward, being so located relative to one another to prevent movement of the center during injection molding. An advantageous arrangement includes at least three projections, two of which are on the equator of the center and the third coinciding with the south polar axis. The south polar projection will be equal in length to the thickness of the cover, i.e. about 0.1 to 0.2 inch, while the two equatorial projections will be slightly longer so as to fit suitable recesses in the outer mold halves. These will project through the cover but will be buffed away with the usual equatorial mold flash.

Alternatively, the ionic copolymer may be injection molded at about 120° to 200° C. into smooth-surfaced hemispherical shells of slightly larger mass than required and then a center and two shells placed into a dimpled golf ball mold at about 110° to 200° C. If the covering is relatively thin, e.g. about 0.003 to 0.1 inch, the ionic copolymer can be joined to the center by electrodeposition.

Before electrodepsoition, if practiced, or otherwise after molding, any mold marks are buffed off. The ball, after provision of the coating, is abraded, and the ball is painted and marked, and is then ready for use. Painting may be effected in the conventional manner using the conventional paints used for golf balls, as, for example, enamel, polyurethane, epoxy, acrylic or vinyl paints.

The invention will be further described in the following illustrative examples wherein all parts are by weight unless otherwise expressed.

In these examples, the properties of the golf balls are measured by a variety of tests.

The cannon life test is a measure of the durability of a golf ball under severe impact conditions. In this test, a box is constructed of ¼-inch thick steel plate in the shape of a rectangular prism with edges 2 ft. by 2 ft. by 3 ft. One end of a steel tube 1.687 inches in internal diameter by 5 ft. long is sealed to one 2 ft. by 3 ft. face of the box at a point which is one foot from a 2 ft. edge and the same distance from a 3 ft. edge. The axis of the tube is inclined 45° to a line parallel to the 2 ft. edge of said face, and 80° to a line parallel to the 3 ft. edge of the face. The other end of the tube is connected to a 20-gallon air tank via a fast-acting valve and contains a port for introducing a golf ball. The tube thus constitutes an air cannon.

In operation, the air tank is pressurized to 40 or 70 pounds per square inch, and the ball is shot into the box by sudden release of the air pressure. The "cannon life" is the average number of successive shots which a golf ball will withstand before rupturing or otherwise becoming unplayable. Usually about four to ten balls are tested for cannon life, and the results are averaged.

"Rebound" is the height to which a ball will bounce, expressed as a percentage of the height from which it is dropped onto a hard, flat, horizontal surface, such as a thick marble slab. A ball with higher rebound is "livelier" in play and is thus more acceptable to serious or professional golfers. For two golf balls equal in compression and hardness the ball with the higher rebound generally also has the more acceptable "click".

The distance of various kinds of golf balls are compared using a driving machine. The driving machine consists essentially of a golf club face attached to the periphery of a steel flywheel, 24 inches in diameter, and weighing 300 pounds. The golf club face is adjusted to strike the test golf balls while making an angle of 17° to the vertical. In operation, the flywheel is rotated at a speed of 1200 revolutions per minute, corresponding to a club face velocity of 150 ft./sec., and a means is provided to hit the balls at the rate of 120 balls per minute. At this rate variations in wind or other weather factors do not affect the validity of a direct comparison among the distances of different balls thus struck within a very short period of time. To compare balls for distance, alternate sample balls of the different types are driven at the rate of about 120 balls per minute, caught in a sand trap, and their distances measured. Several balls of each type, usually 10, are tested and the results are averaged.

The term "Compression" in the golf ball industry relates to an arbitrary value expressed by a number which can range from 0 to over 100, and that defines the deflection that a golf ball undergoes when subjected to a compressive loading. The specific test is made in an apparatus fashioned in the form of a small press with an upper and a lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring.

The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 90 or 100 which means that the upper anvil was deflected a total of 0.190 or 0.200 inches.

EXAMPLE 1

A blend was made of 266.7 grams of 98% cis-polybutadiene and 54.42 grams of a 2 to 1 zinc oxide/cis-polybutadiene blend containing 0.82% antioxidant 2,2'-methylene bis(4-methyl-6-t-butyl phenol) on a 6×12-inch laboratory mill. The 98% cis-polybutadiene is Taktene 1203 made by Polysar Limited. The antioxidant is made by American Cyanamid Co. under the trade name of AO 2246. To the blend was added 57.0 grams of glacial methacrylic acid. The mixture was blended several minutes and then the compound was removed from the mill. The mill was heated to about 240° F. by passing steam through the jacket of the mill. The steam was turned off and the batch was mixed for about two minutes at a batch temperature of 185° to 200° F. The batch was removed, the mill rolls cooled to room temperature and 45.06 grams of a 2/1 zinc oxide/polybutadiene masterbatch and 51 grams of zinc oxide were added to the compound. When the addition of these ingredients was completed, 17.82 grams of Di-Cup 40C was added to the batch. Di-Cup 40C is a commercial polymerization initiator consisting of 40% dicumyl peroxide supported on calcium carbonate.

The batch was sheeted, rolled and made into slugs by cutting the oval-shaped rolled sheet of about 1¼×¾-inch diameter into lengths of about 1¼ inches. The slugs were molded for 30 minutes at 160° C. into isometric centers. Typical compression values were:
EXAMPLE 1 continued

| Pole | Equator | Max. Diff. |
|------|---------|------------|
| 41 | 43 | 41 | 2 |
| 48 | 52 | 49 | 3 |
| 48 | 49 | 46 | 3 |
| 38 | 38 | 38 | 0 |
| 50 | 55 | 55 | 5 |
| 49 | 46 | 44 | 5 |
| 35 | 38 | 38 | 3 |

The centers were dipped for eight minutes into a solution of 1.25 pounds of chromic acid in 0.20 gallons of water, and washed with water. The washed centers were exposed to a solution of sodium hypochlorite and hydrochloric acid for 10 minutes, washed, and dried.

The covers made using an ionic copolymer of 96.5 mole percent of ethylene and 3.5 mole percent of glacial methacrylic acid, wherein 50% of the acid was neutralized with zinc ions, were molded onto the centers at 150° C. using a dimpled, mating precision mold.

EXAMPLE 2

A blend was made of 266.7 grams of 98% cis-polybutadiene and 54.42 grams of 2/1 zinc oxide/cis-polybutadiene blend containing 1.6 pounds of 2,2'-methylene bis(4-methyl-6-tertiary butyl phenol) in 196.6 pounds of compound on a 6×12-inch laboratory mill. To the blend was added 51 grams of glacial methacrylic acid. The mixture was blended several minutes, and then the compound was removed from the mill. The mill was heated to about 240° F. by passing steam through the jacket of the mill. The steam was turned off and the batch was mixed for about two minutes at batch temperature of 203° to 208° F. The batch was removed and the mill rolls cooled to room temperature, and 45.1 grams of a 2/1 zinc oxide/polybutadiene masterbatch and 42 grams of zinc oxide were added to the compound. When the addition of these ingredients was completed, 17.82 grams of Di-Cup 40C was added to the batch on the mill.

The batch was sheeted, rolled and made into slugs by cutting the oval-shaped rolled sheet of about 1¼×1¾-inch diameter into lengths of about 1¼ inches. The slugs were molded for 30 minutes at 160° C. into isometric centers. Typical compressions were:

| Pole | Equator | Max. Diff. |
|------|---------|------------|
| 40 | 46 | 39 | 7 |
| 35 | 41 | 38 | 6 |
| 35 | 33 | 32 | 3 |
| 45 | 47 | 45 | 2 |
| 44 | 46 | 44 | 2 |
| 37 | 36 | 34 | 3 |
| 40 | 48 | 40 | 8 |
| 35 | 36 | 35 | 1 |

Average properties of the centers were as follows: rebound of 82% and cannon life at 70 psi of 1. The centers were surface treated by the procedure given in Example 1 and covers were molded onto the centers according to Example 1 except that the acid in the copolymer was neutralized 50% with magnesium and 10% with zinc.

EXAMPLE 3

Centers were made in accordance with the procedures given in Example 2 except that 45 grams of glacial methacrylic acid were used. The properties of the centers were as follows: compression—24 and rebound—83%.

Typical compressions were:

| Pole | Equator | Max. Diff. |
|------|---------|------------|
| 29 | 28 | 26 | 3 |
| 26 | 31 | 30 | 5 |
| 26 | 26 | 24 | 2 |
| 23 | 23 | 23 | 0 |
| 30 | 40 | 33 | 7 |
| 22 | 20 | 22 | 2 |

Covers consisted of an ethylene-methacrylic acid copolymer which has sodium ions uniformly distributed throughout the polymer chain and which ions neutralize about 50% of the methacrylic acid. The covers were molded onto the surface treated centers according to the procedure of Example 1.

EXAMPLE 4

Centers were made in accordance with the procedures given in Example 2 except that 33 grams of methacrylic acid were used. The centers had a rebound of 88% and zero compression. Covers were molded onto the centers using the procedure of Example 1 except that the copolymer had 11 mole % of methacrylic acid and the acid was 58% neutralized with sodium ions.

EXAMPLE 5

To a #3A Banbury were added 65.2 pounds of cis-polybutadiene and 14.43 pounds of 2/1 zinc oxide/cis-polybutadiene masterbatch. The ingredients were mixed and 17.02 pounds of methacrylic acid were pumped into the Banbury. After the addition was completed, the batch was mixed and 28.56 pounds of 2/1 zinc oxide/cis-polybutadiene masterbatch was dumped into the Banbury. The batch was mixed, dumped and sheeted on a 16×42" 2-roll mill. The sheets were allowed to cool to room temperature.

The sheets were returned to the Banbury and 4.25 pounds of Di-Cup 40C was added. The ingredients were mixed, dumped and the compound sheeted on 16×42" 2-roll mill. The sheets were returned to the mill, 4-inch strips were removed, allowed to cool and fed to a 4½ inch Davis-Standard extruder containing a rubber extrusion screw. The compound was fed through a split die to obtain two extrudate strands. As slugs were needed, the strands were fed into a slug cutter to obtain suitable forms. The slugs were molded for 15 minutes at 180° C. into centers having a compression of 86 and a rebound of 77%. The centers were converted into 2-piece golf balls by molding an ethylene-methacrylic acid copolymer (50% zinc neutralized) cover onto the centers.

EXAMPLE 6

A blend was made of 266.7 grams of 98% cis-polybutadiene and 54.4 grams of 2/1 zinc oxide/cis-polybutadiene masterbatch on a 6×12-inch laboratory mill. To the blend were added 51 grams of glacial methacrylic acid, followed by 45.1 grams of 2/1 zinc oxide/-cis-polybutadiene masterbatch and 42 grams of zinc oxide. The mill was heated to about 240° F. by passing steam through the jacket of the mill. The steam was turned off and the batch was mixed for about ten minutes at stock temperatures of 218° to 225° F. The mill was cooled to room temperature and 17.82 grams of Di-Cup 40C was added to the batch.

Slugs were prepared from oval-shaped rolled sheet and centers were molded at about 160° C. Typical compression values were:

| Pole | Equator | | Max. Diff. |
|---|---|---|---|
| 41 | 41 | 41 | 0 |
| 48 | 55 | 50 | 7 |
| 43 | 46 | 43 | 3 |
| 44 | 52 | 48 | 8 |
| 34 | 37 | 37 | 3 |
| 34 | 36 | 35 | 2 |
| 48 | 52 | 52 | 4 |
| 49 | 57 | 55 | 8 |

Centers were molded at about 160° C. having a cannon life of 2 at 70 psi. The centers were capable of being converted into 2-piece golf balls.

EXAMPLE 7

A blend was made in accord with the procedures given in Example 6 except that 54 grams of glacial methacrylic acid was used. Centers were molded at 160° C. Typical compression values were:

| Pole | Equator | Max. Diff. |
|---|---|---|
| 60 | 62 | 61 | 2 |
| 57 | 62 | 60 | 5 |
| 51 | 54 | 54 | 3 |
| 52 | 54 | 53 | 2 |
| 45 | 50 | 50 | 5 |
| 40 | 42 | 41 | 2 |
| 40 | 48 | 46 | 8 |
| 49 | 49 | 48 | 1 |
| 56 | 62 | 60 | 6 |

The centers had a cannon life of 2 at 70 psi.

EXAMPLE 8

Blend was made in accord with the procedures given in Example 6 except that 57 grams of glacial methacrylic acid was used. Centers were molded at 160° C. Typical compression values were:

| Pole | Equator | Max. Diff. |
|---|---|---|
| 60 | 67 | 60 | 7 |
| 45 | 50 | 48 | 5 |
| 44 | 50 | 48 | 6 |
| 59 | 63 | 61 | 4 |
| 57 | 60 | 58 | 3 |
| 46 | 52 | 50 | 6 |
| 48 | 52 | 52 | 4 |
| 46 | 51 | 50 | 5 |
| 51 | 55 | 54 | 4 |
| 58 | 62 | 60 | 4 |
| 50 | 53 | 53 | 3 |

The centers had a common life of 2 at 70 psi.

EXAMPLE 9

To a No. 3A Banbury were added 65.2 pounds of cis-polybutadiene and 14.43 pounds of 2/1 zinc oxide/-cis-polybutadiene masterbatch. The ingredients were mixed and 15.11 pounds of methacrylic acid were pumped into the Banbury. After the addition was completed, the batch was mixed and 28.56 pounds of 2/1 zinc oxide/cis-polybutadiene masterbatch was dumped into the Banbury. The batch was mixed, dumped and sheeted on a plant 2-roll mill. The sheets were allowed to cool to room temperature.

The sheets were returned to the Banbury and 3.98 pounds of Di-Cup 40C were added. The ingredients were mixed, dumped and the compound sheeted on a plant 2-roll mill. The sheets were returned to the mill, 4-inch strips were removed, allowed to cool and fed to the extruder. The compound was fed through a split die to obtain two extrudate strands. After different periods of time, a pair of strands was fed to a slug cutter to obtain slugs that weighed about 40–45 grams. Also, some compound was sheeted, rolled and slugs were cut from the rolled sheet.

The extrudate and cut-slugs had a cylindrical shape and that of Example 9 was molded as is. The extruded and cut-slugs of Examples 10 to 12 and 14 to 17 were formed into capped slugs which were formed by cutting a slug transversely into two sub-slugs, separating one of every paired sub-slug and placing one half on top of the cut portion and one half on the bottom of the other sub-slug, as described in copending application Ser. No. 602,959, now U.S. Pat. No. 4,065,537, giving masses with multi-directed lines of orientation. The slugs were molded at 160°, 170° and 180° C. for 30, 20 and 15 minutes, respectively. The properties of the centers were measured and are given in Table I. Some of the centers were subjected to a chlorination treatment and the remainder were given a chromic acid treatment followed by a chlorination treatment.

The centers of Examples No. 9 through 15 were converted into two-piece golf balls by molding a cover of an ionic polymer, viz. ethylene-methacrylic acid copolymer neutralized with zinc, onto the centers. Centers from Example 12 and 15 had excellent adhesion to the cover whereas centers from Example 14 had only slight adhesion to the cover; the adhesions of the others were not tested. Golf balls using centers from Examples 12, 14 and 15 had the best distance in golf ball distance tests and were considerably better in distance than the unitary golf balls using either the original Bartsch formula or the improved metal-containing monomer formula of application Ser. No. 250,147 now U.S. Pat. No. 4,056,269.

The advantage accruing to centers made using slugs having peripheral lines of orientation as in the capped slug or having random multi-oriented lines as in the milled slug is evident from the small difference in pole and equator compressions as compared to that of the cylindrical shaped slug in Example No. 9.

batch was removed from the mill and steam was passed through the rolls of the mill to raise the temperature to about 115° C. The steam was turned off and the batch was mixed for about ten minutes to obtain stock temperatures of 103° to 107° C. The batch was removed and the mill rolls cooled to room temperature. To the blend on the mill were added 17.82 grams of Di-Cup 40C. The batch was sheeted, rolled and slugs were cut from the rolled sheet. Slugs were molded for 30 minutes at 159° C. to give centers with a compression of 43, rebound of 80% and a cannon life at 70 psi of 3, and slugs were molded for 15 minutes at about 178° C. to give centers having a compression of 47, rebound of 80% and a cannon life at 70 psi of 1. The centers were surface treated with chromic acid, washed and chlorinated, and then were converted into two-piece golf balls by molding a salt-neutralized ethylene-methacrylic acid copolymer cover onto the centers.

EXAMPLE 20

Compound similar to that described in Example 9 was made except that 26 pounds of the masterbatch, 70 pounds of 98% cis-polybutadiene, 17.0 pounds of glacial

TABLE I

| Example No. | Age of Stock, days | Slug Shape | Mold Temp. °C. | Mold Time min. | Surface Treatment | Compression at Pole | Compression Pole-Eq. Dif. | Rebound % | Cannon Life at 70 psi |
|---|---|---|---|---|---|---|---|---|---|
| 9 | 15 | Cylinder | 160 | 30 | Acid,Chlor. | 67 | 13 | 78 | 5.2 |
| 10 | 15 | Capped | 160 | 30 | Acid,Chlor. | 55 | 6 | 79 | 15+ |
| 11 | 15 | Capped | 170 | 20 | Acid,Chlor. | 61 | 5 | 80 | 6 |
| 12 | 15 | Capped | 180 | 15 | Acid,Chlor. | 60 | 4 | 78 | 4.5 |
| 13 | 15 | Milled | 180 | 15 | Acid,Chlor. | 62 | 6 | 79 | 5.5 |
| 14 | 31 | Capped | 180 | 15 | Chlor. | 58 | — | 80 | $4^a$ |
| 15 | 31 | Capped | 180 | 15 | Acid,Chlor. | 58 | — | 80 | $2.5^a$ |
| 16 | 46 | Capped | 180 | 15 | Acid,Chlor. | 61 | — | 80 | $10^a$ |
| 17 | 46 | Capped | 180 | 15 | Acid,Chlor. | 58 | — | 80 | $68^a$ |

$^a$Cannon life was taken after rather than before surface treatment.

EXAMPLE 18

A blend was made of 300 grams of cis-polybutadiene, 72 grams of reinforcing silica-HiSil 215 and 0.806 g of 2,2'-methylene bis(4-methyl-6-t-butyl phenol) as antioxidant. To the blend were added 36.3 grams of zinc oxide followed by 51 grams of methacrylic acid. The rolls were heated with steam to about 115° C. and the steam was turned off. The batch was mixed for about ten minutes at a stock temperature of 101° to 103° C. The mill rolls were cooled to room temperature and 17.82 grams of Di-Cup 40C were added. The stock was sheeted and rolled, and slugs were cut from the rolled sheet. The slugs were molded at 159° C. to give centers having a compression of 59, rebound of 78% and a cannon life at 70 psi of 9. The centers were surface treated with chromic acid, washed and chlorinated, and then were converted into two-piece golf balls by molding a salt-neutralized ethylene-methacrylic acid copolymer cover onto the centers.

EXAMPLE 19

On a laboratory mill a blend was made of 300 grams of cis-polybutadiene and 0.8 g of the antioxidant of Example 18. To the blend was added a small portion of 36 grams of reinforcing silica. To some of the silica on the nip was added by syringe 2.9 grams of A-189 silane-gamma-mercaptopropyltrimethoxysilane. The remainder of the 36 grams of silica was added, followed by 36.3 grams of zinc oxide and 45.0 grams of methacrylic acid. After the addition of the methacrylic acid, the methacrylic acid and 3.5 pounds of Di-Cup 40C were used and centers may be molded to a diameter of 1.675 inches. The centers may be surface treated using acid and chlorination methods and then ethylene-methacrylic acid type copolymer in powder form may be fused onto the centers using an electrostatic fluidized bed of plastic powder. The centers may be preheated to 180° F., the powder may be charged negatively to 40 KV and may be deposited by electrostatic attraction onto rotating centers. Mechanical fingers may be used to change the position of the centers to obtain uniform and complete deposition of the plastic onto the centers. The centers may be coated with 5 mils of plastic. Other centers with a diameter of 1.665 inches may be given a heavier coat of 0.015 mils of plastic.

Additionally, other centers may be given a coating of plastic using a fluidized bed dip process. Timed infrared heating may be employed for about 50 seconds at a radiant temperature of 1750° F.

EXAMPLE 21

Golf balls made in Examples 1, 2, 3, 18 and 19 were driven by a hitting ball machine. Average results of five different runs of the test were:

| Example No. | Filler Type | Glacial Methacrylic Acid Grams/Batch | Distance Yards |
|---|---|---|---|
| 1 | Zinc Oxide | 57 | 231.4 |
| 2 | Zinc Oxide | 51 | 232.3 |
| 3 | Zinc Oxide | 45 | 232.5* |
| 18 | Silica | 51 | 219.6 |
| 19 | Silica | 45 | 217.7 |

*Based on distance data obtained in a separate test with golf balls made in Example 2.

The same test included 2-piece golf balls derived from centers made in Example 5 by molding at 160° and 180° C. for 30 to 15 minutes and converted into 2-piece golf balls. The results were:

|  | Distance, Yards |
|---|---|
| Molded at 160° C. | 227.6 |
| Molded at 180° C. | 229.8 |

EXAMPLE 22

Golf balls made in preceding examples were driven by a hitting ball machine. Distance data were:

| Example | Mold Temp., °C. | Distance Yards |
|---|---|---|
| 10 | 160 | 238 |
| 11 | 170 | 240 |
| 12 | 180 | 242 |
| 15 | 180 | 244 |

Comparison was made of distance tests for golf balls derived from Example 5 using 17.02 pounds of glacial methacrylic acid and from Examples 10 and 15 using 15.11 pounds of glacial methacrylic acid. When comparisons were made to the same control golf ball, the latter golf balls were essentially equivalent (=1 yard) to the control, whereas the former golf balls using centers molded at 160° and 180° C. were 6.9 and 4.7 yards shorter in distance.

A unitary golf ball using a formulation similar to Example 5 except that about 8% more glacial methacrylic acid was used and the golf ball was molded at about 155° C. was 4.6 yards shorter in distance.

It will be appreciated that the instant specification and examples are set forth by way of illustration and not limitation, and that various modifications and changes may be made without departing from the spirit and scope of the present invention.

What is claimed is:

1. A golf ball comprising a center and a cover, said center comprising a substantially spherical homogeneous molded mass of cis-polybutadiene elastomer highly cross-linked in a three dimensional network with long, flexible cross-links formed from zinc dimethacrylate, said zinc dimethacrylate being present in about 0.046 to 0.038 equivalents per mole of said elastomer, said cover comprising an ionic copolymer of at least 50 mole percent of ethylene and at least about 0.2 mole percent of an alpha, beta-ethylenically unsaturated carboxylic acid selected from the group consisting of methacrylic acid and ethylene acrylic acid wherein about 20%–90% of the carboxylic acid groups are neutralized with a metal.

2. A golf ball comprising a center and a cover, said center comprising a substantially spherical homogeneous molded mass of a cis-polybutadiene elastomer highly cross-linked into a three dimensional network with long, flexible cross-links formed from zinc dimethacrylate, said zinc dimethacrylate being present in about 0.046 to 0.038 equivalents per mode of said elastomer, said cover comprising an ionic copolymer of at least about 50 mole percent of ethylene and at least about 0.2 mole percent of an alpha, beta-ethylenically unsaturated carboxylic acid selected from the group consisting of methacrylic acid and ethylene acrylic acid wherein about 20%–90% of the carboxylic acid groups are neutralized with a metal, and said center including a filler in up to about 50 parts per 100 parts by weight of said polybutadiene elastomer, said filler being in addition to said zinc dimethacrylate.

3. A golf ball according to claim 2 wherein said filler is present in about 20 to 40 parts per 100 parts by weight of said polybutadiene elastomer.

4. A golf ball according to claim 2, wherein said zinc dimethacrylate is present in about 15 to 35 parts per 100 parts by weight of the polybutadiene.

5. A golf ball according to claim 4, wherein said center includes about 20 to 40 parts of zinc oxide per 100 parts by weight of said polybutadiene, said cover has a thickness of about 0.1 to 0.2 inch and said ball can be driven at lest 5 yards further than a corresponding one-piece molded golf ball upon application of the same driving force by a driving machine.

6. A golf ball according to claim 4, wherein said center incluides about 20 to 40 parts of zinc oxide per 100 parts by weight of said polybutadiene, said cover has a thickness of about 0.003 to 0.1 inch and said ball can be driven at least 5 yards further than a corresponding one-piece molded golf ball upon application of the same driving force by a driving machine.

7. A golf ball according to claim 3 wherein said filler is zinc oxide.

8. A golf ball according to claim 2 wherein said zinc dimethacrylate is present in the range of 0.06 to 0.25 equivalents per mole of said polybutadiene.

9. A golf ball comprising a center and a cover, said ball being prepared from a composition comprising 100 parts by weight of cis-polybutadiene and between about 15 to 35 parts by weight of zinc dimethacrylate, said elastomer being highly cross-linked into a three dimensional network with long flexible cross-links formed from said zinc dimethacrylate when said composition is cured in a standard golf ball mold at a temperature between 170° C. and 185° C. for from 30 to 35 minutes, said cover comprising an ionic copolymer of at least about 50 mole % of ethylene and at least about 0.2 mole % of an $\alpha,\beta$-ethylenically unsaturated carboxylic acid selected from the group consisting of methacrylic acid and ethylene acrylic acid wherein about 70 to 90% of the carboxylic groups are neutralized with a metal, and said cover having a thickness of between about 0.1 to 0.2 inch, whereby said ball can be driven at least 5 yards further than a corresponding one-piece molded golf ball upon application of the same driving force to said balls by a driving machine.

10. A golf ball comprising a center and a cover, said center comprising a substantially spherical homogeneous molded mass of a cis-polybutadiene elastomer highly cross-linked into a three dimensional network with long, flexible cross-links formed from zinc methacrylate, said zinc methacrylate being present in about 0.046 to 0.38 equivalents per mole of said elastomer, said cover comprising an ionic copolymer of at least about 50 mole percent of ethylene and at least about 0.2 mole percent of an alpha, beta-ethylenically unsaturated carboxylic acid selected from the group comprising methacrylic acid and ethylene acrylic acid wherein about 20%–90% of the carboxylic acid groups are neutralized with a metal.

UNITED STATES PATENT AND TRADEMARK OFFICE
CERTIFICATE OF CORRECTION

PATENT NO. : 4,264,075
DATED : April 28, 1981
INVENTOR(S) : Richard Miller, Murray H. Reich It is certified that error appears in the above–identified patent and that said Letters Patent are hereby corrected as shown below:

Change the name of the Assignee from "Princeton Chemical Research, Inc. to --Victor United, Inc., Morton Grove, Illinois--

Signed and Sealed this

Twentieth Day of October 1981

[SEAL]

Attest:

GERALD J. MOSSINGHOFF

Attesting Officer    Commissioner of Patents and Trademarks